US007896741B2

(12) United States Patent
Kuehling et al.

(10) Patent No.: US 7,896,741 B2
(45) Date of Patent: Mar. 1, 2011

(54) PROGRESSIVE CONTROLLER

(75) Inventors: Brian L. Kuehling, Henderson, NV (US); Michael F. Hollenbeck, North Las Vegas, NV (US); Clyde Ruckle, Las Vegas, NV (US)

(73) Assignee: IGT, Reno, NV (US)

( * ) Notice: Subject to any disclaimer, the term of this patent is extended or adjusted under 35 U.S.C. 154(b) by 40 days.

(21) Appl. No.: 11/582,134

(22) Filed: Oct. 16, 2006

(65) Prior Publication Data

US 2008/0090652 A1 Apr. 17, 2008

(51) Int. Cl.
*A63F 9/24* (2006.01)
*A63F 13/00* (2006.01)

(52) U.S. Cl. ............................ 463/29; 463/24; 463/40; 463/42

(58) Field of Classification Search .................. 463/29, 463/40, 42, 24
See application file for complete search history.

(56) References Cited

U.S. PATENT DOCUMENTS

| | | | | |
|---|---|---|---|---|
| 4,283,709 | A | 8/1981 | Lucero et al. | |
| 5,116,055 | A * | 5/1992 | Tracy | 463/27 |
| 5,146,273 | A | 9/1992 | Yamada | |
| 5,257,981 | A | 11/1993 | Takahashi | |
| 5,280,909 | A | 1/1994 | Tracy | |
| 5,326,104 | A * | 7/1994 | Pease et al. | 463/18 |
| 5,344,144 | A | 9/1994 | Canon | |
| 5,429,361 | A * | 7/1995 | Raven et al. | 463/25 |
| 5,536,016 | A | 7/1996 | Thompson | |
| 5,643,086 | A | 7/1997 | Alcorn et al. | |
| 5,851,149 | A | 12/1998 | Xidos et al. | |
| 5,970,143 | A | 10/1999 | Schneier et al. | |
| 6,110,043 | A | 8/2000 | Olsen | |
| 6,152,824 | A | 11/2000 | Rothschild et al. | |
| 6,178,510 | B1 | 1/2001 | O'Connor et al. | |
| 6,217,448 | B1 | 4/2001 | Olsen | |
| 6,241,608 | B1 | 6/2001 | Torango | |
| 6,264,561 | B1 | 7/2001 | Saffari et al. | |
| RE37,885 | E | 10/2002 | Acres et al. | |

(Continued)

FOREIGN PATENT DOCUMENTS

| | | |
|---|---|---|
| AU | 589158 | 10/1986 |

(Continued)

OTHER PUBLICATIONS

"PGP", sourced from http://web.archive.org/20060505094754/http://www.imss.caltech.edu/cms.php?op=wiki&wiki_op=view&id=244, last updated 2003.*

(Continued)

*Primary Examiner*—Melba Bumgarner
*Assistant Examiner*—Steven J. Hylinski
(74) *Attorney, Agent, or Firm*—Armstrong Teasdale LLP

(57) ABSTRACT

A method and system for configuring a progressive system that insures enhanced operative control and security of the progressive system. The progressive controller provides one or more security keys to access and verify modifications to the progressive configuration. The allocated number of gaming devices connected to the progressive system is authenticated by a dedicated security key. Gaming devices in excess of the allocation are disabled from the progressive system. The security keys are configured with an expiration parameter that requires gaming establishments to remain current with respect to progressive system agreements.

23 Claims, 7 Drawing Sheets

U.S. PATENT DOCUMENTS

| | | | |
|---|---|---|---|
| 6,557,054 B2 | 4/2003 | Reisman | |
| 6,629,019 B2 | 9/2003 | Legge et al. | |
| 6,645,077 B2 * | 11/2003 | Rowe | 463/42 |
| 6,656,048 B2 | 12/2003 | Olsen | |
| 6,712,698 B2 * | 3/2004 | Paulsen et al. | 463/30 |
| 6,722,986 B1 | 4/2004 | Lyons et al. | |
| 6,830,515 B2 | 12/2004 | Rowe | |
| 6,840,860 B1 | 1/2005 | Okuniewicz | |
| 6,854,012 B1 | 2/2005 | Taylor | |
| 6,886,013 B1 | 4/2005 | Beranek | |
| 6,896,618 B2 * | 5/2005 | Benoy et al. | 463/25 |
| 6,908,387 B2 | 6/2005 | Hedrick et al. | |
| 6,934,846 B2 | 8/2005 | Szrek et al. | |
| RE38,812 E | 10/2005 | Acres et al. | |
| 6,965,992 B1 | 11/2005 | Joseph et al. | |
| 7,046,134 B2 | 5/2006 | Hansen | |
| 7,159,765 B2 | 1/2007 | Frerking | |
| 7,258,612 B2 | 8/2007 | Fujimoto | |
| 7,392,470 B2 * | 6/2008 | Kammler | 715/234 |
| 7,491,122 B2 * | 2/2009 | Ryan | 463/29 |
| 2002/0039923 A1 | 4/2002 | Cannon et al. | |
| 2002/0049909 A1 | 4/2002 | Jackson et al. | |
| 2002/0071557 A1 | 6/2002 | Nguyen | |
| 2002/0116615 A1 | 8/2002 | Nguyen et al. | |
| 2002/0152120 A1 | 10/2002 | Howington | |
| 2003/0002378 A1 | 1/2003 | Uchida et al. | |
| 2003/0014639 A1 | 1/2003 | Jackson et al. | |
| 2003/0150915 A1 | 8/2003 | Reece | |
| 2003/0153375 A1 | 8/2003 | Vancura | |
| 2003/0181231 A1 | 9/2003 | Vancura et al. | |
| 2003/0195037 A1 | 10/2003 | Vuong et al. | |
| 2003/0203755 A1 | 10/2003 | Jackson | |
| 2003/0203756 A1 | 10/2003 | Jackson | |
| 2004/0038735 A1 | 2/2004 | Steil et al. | |
| 2004/0072611 A1 * | 4/2004 | Wolf et al. | 463/20 |
| 2004/0077408 A1 * | 4/2004 | D'Amico et al. | 463/42 |
| 2004/0082384 A1 * | 4/2004 | Walker et al. | 463/40 |
| 2004/0092304 A1 | 5/2004 | George et al. | |
| 2004/0097285 A1 * | 5/2004 | Fisher et al. | 463/24 |
| 2005/0009599 A1 * | 1/2005 | Ryan | 463/29 |
| 2005/0054446 A1 * | 3/2005 | Kammler et al. | 463/42 |
| 2005/0059494 A1 * | 3/2005 | Kammler | 463/42 |
| 2005/0113172 A1 | 5/2005 | Gong | |
| 2005/0116020 A1 | 6/2005 | Smolucha et al. | |
| 2005/0148393 A1 | 7/2005 | Crumby | |
| 2005/0192099 A1 | 9/2005 | Nguyen et al. | |
| 2006/0076404 A1 * | 4/2006 | Frerking | 235/382 |
| 2006/0093142 A1 | 5/2006 | Schneier et al. | |
| 2006/0116194 A1 | 6/2006 | Pacey et al. | |
| 2006/0166731 A1 | 7/2006 | Yoshimi et al. | |
| 2006/0166735 A1 | 7/2006 | Steil et al. | |
| 2006/0183537 A1 | 8/2006 | Dickerson | |
| 2006/0252530 A1 * | 11/2006 | Oberberger et al. | 463/29 |
| 2006/0287098 A1 * | 12/2006 | Morrow et al. | 463/42 |
| 2007/0021194 A1 | 1/2007 | Aida | |
| 2007/0105628 A1 * | 5/2007 | Arbogast et al. | 463/42 |
| 2008/0058059 A1 * | 3/2008 | Fitzsimons et al. | 463/20 |

FOREIGN PATENT DOCUMENTS

| | | |
|---|---|---|
| AU | 655801 | 1/1995 |
| WO | 2008/048465 A3 | 4/2008 |

OTHER PUBLICATIONS

One Link BSK 100 Slot System Architecture, Paltronics, Inc., 1 page, Date Unknown.

Hot Potato—Compliance Manual, Mikohn, 21 pages, Jun. 1, 1999.

One Line LSK500 Slot System Architecture, Paltronics, Inc., 1 page, Date Unknown.

Mikohn Mystery DCU Controller—Technician's Installation and Configuration Guide, Mikohn, 53 pages, Apr. 10, 2002.

One Link Media Network Diagram Standard Configuration, Paltronics, Inc., 1 page, Date Unknown.

Media systems Solutions, Paltronics, Inc., Brochure, 8 pages, Date Unknown.

Slot Systems Solutions, Paltronics, Inc., Brochure, 12 pages, Date Unknown.

System Comparison Chart, Paltronics, Inc., 1 page, Date Unknown.

Mikohn MoneyTime—Technician's Installation and Configuration Guide, Mikohn, 63 pages, Jul. 3, 2002.

IGT Mystery Progressive Jackpot User Manual, Mikohn, 22 pages, Mar. 1995.

Random Bonus Jackpot Users Manual, Mikohn, 18 pages, Dec. 1995.

One Link Ultimate Media System UMS5000, Paltronics, Inc., 1 page, Date Unknown.

One Link Ultimate Media Client System UMS5000—Client, Paltronics, Inc., 1 page, Date Unknown.

One Link Streaming Server UMS50000-SS, Paltronics, Inc., 1 page, Date Unknown.

Shermin Voshmgir, XML Tutorial, http://www.javacommerce.com/displaypage.jsp?name=intro.sql&id=18238, 1999.

* cited by examiner

PROGRESSIVE CONTROLLER

BACKGROUND OF THE INVENTION

1. Field of the Invention

The present invention relates to gaming and in particular to a method and system for secure configuration and operation of progressive awards.

2. Related Art

Games of chance have been enjoyed by people for many years and have undergone increased and widespread popularity in recent times. As with most forms of entertainment, some players enjoy playing a single favorite game, while others prefer playing a wide variety of games. In response to the diverse range of player preferences, gaming establishments commonly offer many types of games and potential for increased winnings associated with these games, such as enhanced bonuses, progressive awards, and various prizes.

As is well known in the art and as used herein, the terms "gaming" and "gaming devices" are used to indicate that some form of wagering is involved, and that players must make wagers of value, whether actual currency or some equivalent value, e.g., token or credit. This is in contrast to the playing of non-wagering games, which implies the absence of a wager of value, and the possibility of receiving a payout; and in which skill is ordinarily an essential part of the non-wagering game.

There are many different bonus incentives that a gaming establishment may offer to entice a player to place a wager at the gaming device. An example of such a bonus is a progressive award or jackpot that accumulates over time and increases based on the number of players participating. In a progressive award, a cumulative portion of the wagers placed on the associated gaming devices is added to the progressive amount. Correspondingly, the more players that participate in the progressive award the larger and faster the award accumulates.

Gaming establishments frequently participate in a wide selection of progressive based award programs. The gaming establishments commonly assign a designated group of gaming devices to a progressive award type. Further, a gaming establishment may be required to account for each gaming device associated with the progressive award, such as by paying a use fee or license fee to a manufacturer or distributor for the progressive system. The use fee or license fee can be paid on a daily basis for each gaming device (which could be a slot machine, video poker machine, video table game such as Tablemax®, or a mobile gaming device) offering the progressive award which could include a mystery progressive.

In general, a progressive controller is utilized to oversee and control operation of the progressive system. The progressive controller often communicates with the gaming machines and hence manages the progressive for each machine. One drawback of existing systems is that the configuration of a progressive controller may be altered to establish an improper progressive controller configuration. In the event a progressive controller configuration is modified, the gaming establishment may face significant risk of financial injury because the progressive controller configuration may pay an award that is excessive or provide awards too often.

In the existing progressive controllers, the progressive controller settings are usually accessed by way of a password protected logon procedure. While password protection is somewhat beneficial, this type of protection is vulnerable in several respects. First, a password may be shared among several users and once the password is out of the direct control of the password owner, the security of password protection is compromised. Second, passwords may be anticipated. For example, many people will use their birthday, pet's name or a nickname for a password. Thus, a person wishing to guess or anticipate the password may initiate the process by researching the password owner's background and then using the owner's common information, such as a birthday, in an attempt to hack the password. Third, a password may be inadvertently observed by another individual during the login process. Finally, the actual entry of the password may be recorded by an algorithm or other type of data logging device.

Another drawback with existing progressive controllers is that the progressive system manufacturer has little or no control over the number of gaming devices that may be connected to the progressive award system. Commonly in the gaming industry, a gaming establishment will agree to pay a fee for each gaming device connected to the progressive controller. The agreement will frequently limit and specifically designate the number of gaming devices that may be connected to the progressive controller. In this way, if the gaming establishment increases the number gaming devices or groups of gaming devices, the establishment is pay an additional fee. Undesirably however, existing progressive controllers permit the gaming establishment to connect additional gaming devices to the progressive award system without paying an additional fee.

As a result, there is a need in the art for a progressive controller which overcomes the drawbacks in the prior art. The method and apparatus described herein overcomes these drawbacks and provides additional benefits.

SUMMARY OF THE INVENTION

To overcome the drawbacks of the existing systems and provide additional benefits, a method and system is disclosed which securely configure a progressive award system, verifies and permits only the licensed number of gaming devices to access the system.

In one embodiment, a system for configuring and authenticating a progressive game network is disclosed which comprising a first security key, a second security key, and a progressive controller. The progressive controller comprises an integrated key interface, which is configured to receive the first security key or the second security key. The progressive controller further comprises memory having machine readable code stored thereon. The machine readable code is configured to authenticate the first security key or the second security key when the first security key or the second security key is in the key interface. If the authentication is successful, then the code permits programming of the progressive controller or operation of a predetermined number of game devices associated with the progressive controller based on whether the first security key or the second security key was authenticated In one embodiment, the first security key and the second security key comprise a processor and memory. Furthermore, the first security key may comprise a programming key and the second security key may comprise a run key. Additionally, the run key may further comprise an expiration parameter which, when expired, prevents operation of the run key, the progressive controller, or both.

In still another embodiment the machine readable code is further configured to, as part of the authentication, perform a calculation on a value sent to the first security key or the second security key and compare a value resulting from the calculation to a value received from the first security key or the second security key.

In one embodiment, the invention further comprises a gaming machine interface configured to disable one or more aspects of the game device if the authentication is unsuccessful. The authentication may compare data stored within the security key with data stored within the progressive controller.

Also disclosed herein is a system for configuring and authenticating a progressive game network. The system comprises at least one security key configured to interface with a progressive controller. In one embodiment the progressive controller further comprises at least one key interface configured to receive at least one security key and at least one input/output port configured to interface with one or more gaming device interfaces associated with one or more gaming devices, Also part of this embodiment is an authenticator configured to interface with the at least one security key. The authenticator is used to authenticate at least one security key and enable operation of the progressive controller if the authentication was successful. Conversely, if the authentication is unsuccessful, the authenticator disables operation of the progressive controller, gaming device interfaces or both. Another embodiment has an authenticator that comprises hardware, software or a combination of both. Additionally, in one embodiment the at least one security key comprises a program key and a run key. In another embodiment the progressive controller is configured to operate a predetermined number of game devices only if at least one run key is interfacing with the key interface and if the at least one run key authenticates.

Also disclosed herein is a method of configuring a progressive system. The method includes receiving a security key into a key interface, such that the key interface is associated with a progressive controller and the security key is configured to enable configuration of the progressive controller. The method further comprises interrogating the security key and correspondingly if, the interrogation was successful, then displaying at least one progressive controller parameter modification options. The method next enables modifying one or more progressive controller parameters and storing the modified parameters in the progressive controller. Next, this method removes the security key from the key interface and un-displaying the at least one progressive controller parameter modification options.

In one variation, the step of interrogating comprises analyzing data received from the security key. The interrogating may further comprise generating a first value within the progressive controller and sending the first value from the progressive controller to the security key. The method then processes the first value within the security key to generate second value and processes the first value within the progressive controller to generate a third value. Finally, this method compares the second value to the third value. Additionally, in one embodiment, the step of interrogating repeats one or more times during the displaying and modifying.

In another embodiment, the method also displays at least one progressive controller parameter modification options that comprise displaying one or more menu options for software configuration. Additionally, this method may receive a security key that disables operation of the progressive system with respect to a predetermined number of game devices connected thereto.

Similarly, disclosed herein is a method of enabling operation of a progressive system by receiving a security key into a key interface such that the key interface is associated with a progressive controller and the security key is configured to enable operation of the progressive controller. The method further comprises interrogating the security key and if the interrogation was successful, then enabling operation of a predetermined number of game devices coupled with the progressive system. Conversely, if the interrogation was unsuccessful, then the method disables operation of the progressive system. The method also comprises operating the progressive system, and intermittently monitoring for the presence of and interrogating the security key while the progressive system is operating. If the monitoring was successful then enabling operation of the progressive system. If the monitoring unsuccessful, then disabling operation of the progressive system.

In another embodiment, the interrogating step comprises analyzing data received from the security key. Additionally, in one embodiment, the interrogating comprises generating a first value within the progressive controller and then sending the first value from the progressive controller to the security key. The process then processes the first value within the security key to generate a second value (which may be encrypted) and processing the first value within the progressive controller to generate a third value. This embodiment then compares the second value to the third value. In another embodiment, the step of interrogating repeats one or more times during the operation.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF THE PREFERRED EMBODIMENTS

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Figure 1:
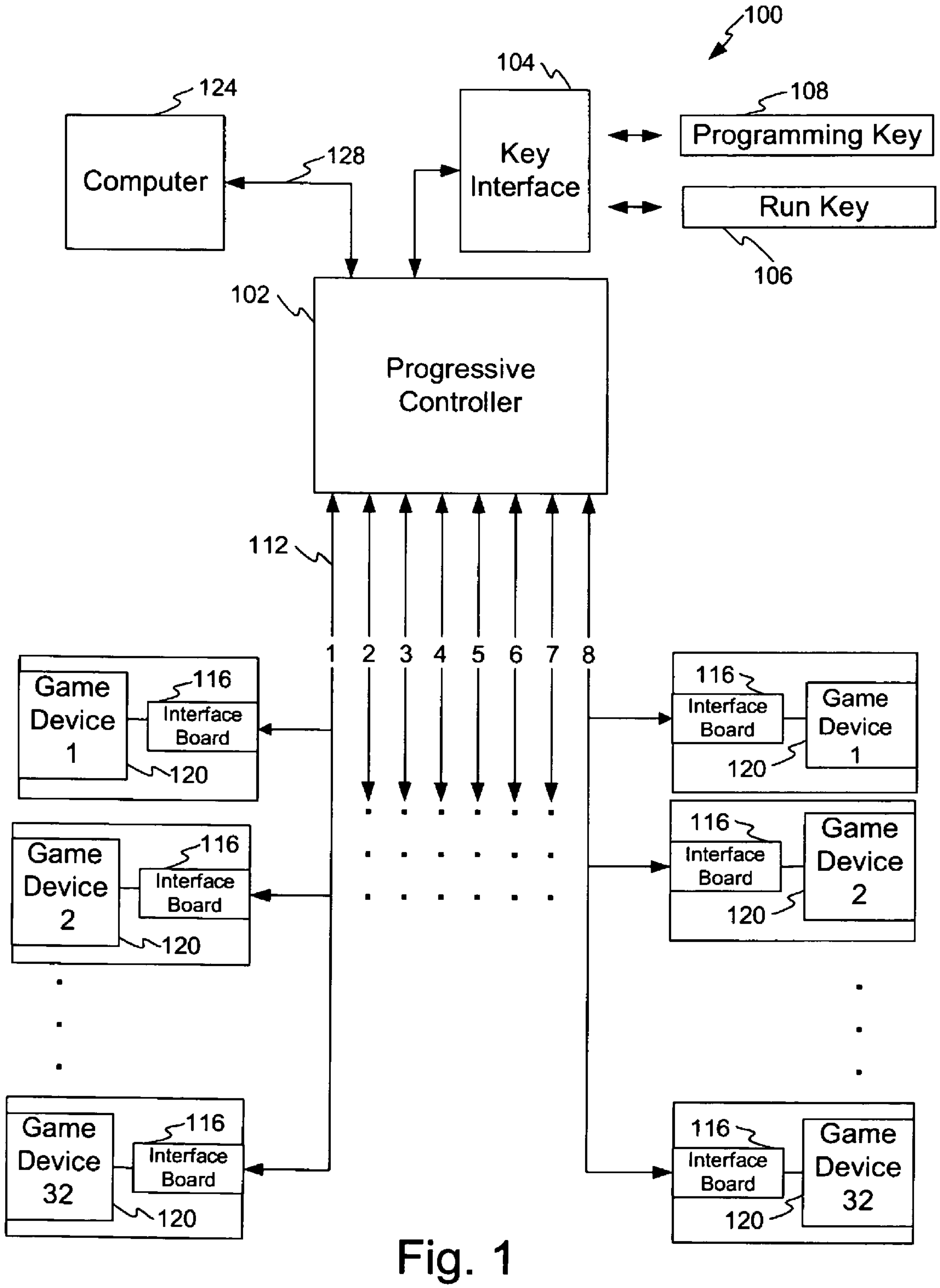
FIG. 1 illustrates a progressive game network with a plurality of gaming devices in communication with a progressive controller.

Referring now to the drawings, FIG. 1 illustrates a progressive game network 100. As seen in FIG. 1, a progressive controller 102 connects and controls the progressive game network 100. The progressive controller 102 monitors the game devices 120 that are connected to the game network 100. The progressive controller 102 also manages the progressive award by performing various accounting procedures (including but not limited to how much of each wager is incremented to the progressive and how much is placed in a reserve account for reseeding a progressive) regarding the amount wagered at each of the game devices 120 associated with the game network 100. The progressive controller 102 assigns a predetermined portion of the amounts wagered at each game device 120 to the progressive award amount. The progressive controller 102 also provides a series of menus displayed on a computer 124 for facilitating configuration of the various progressive awards that may be active on the game network 100.

In an alternate embodiment, the progressive controller 102 is contained within a central server which could include a thin client form or using downloadable games (not shown). A central server connects to game devices 120 and provides communication between the progressive controller 102 and associated game devices. Additionally, the central server may provide game information to the game devices. The information includes game rules, game graphics, game sounds and game outcomes.

The key interface 104, integrated within the controller 102, is configured in this example embodiment to accept a single security key such as a run key 106 or a programming key 108. The security keys are discussed in greater detail below. The key interface 104 facilitates communication between the security keys and the progressive controller 102 by way of a bi-directional communication link.

A plurality of bi-directional communication channels 112 are provided for two-way communication between the progressive controller 102 and a series of game devices 120. Communication between the progressive controller 102 and game device 120 is facilitated by an interface board 116. In this example embodiment the progressive controller 102 has eight or more channels 112, and each channel operatively connects 32 or more game devices 120 to the progressive controller. In one embodiment the progressive controller 102 handles 256 or more associated game devices 120 (i.e. eight channels each connecting 32 game devices for a total of 256). It is contemplated that in other embodiments different number of channels or connections may be provided.

The progressive controller 102 communicates with a computer 124 by way of a bi-directional communication link 128. In one embodiment the computer 124 may be replaced with other computing devices such as a desktop computer or handheld device (e.g., a personal data assistant (PDA)). In one embodiment the communication link 128 is a secure Ethernet type communication link or USB connection, however, other types of secure communication links may be used such as, serial connections, dial-up or wireless connections. Alternatively, the connection 128 may occur via a network connection.

In one embodiment, the game device 120 is configured as a slot-type gaming device. A slot-type game device typically has a plurality of physical reel assemblies with various indicia located around the circumference of the reel. The game device provides control means for receiving a wager, activating and spinning the reels, stopping the reels, determining an outcome, and paying an award if applicable. During play of the slot-type game device, the player attempts to receive a predetermined arrangement of the indicia. The indicia are then compared against a pay table for determination of any possible winning outcomes.

In another embodiment, the game device 120 comprises a video-type game device. A video-type game device includes a computer generation or representation of the mechanical reels of the slot-type game device described above.

A video-type game device may include video poker such as Double Bonus. The video-type game device may comprise a series of games that are different from the common slot type game. Some examples of these alternate types of games would be various card games (poker, twenty-one, baccarat, etc.), keno, roulette or dice games. In the video type game device, there is a computer or microprocessor which is enabled to accept a wager, display a game, determine a game outcome and pay an award if applicable. The game device also provides a means for currency handling, receiving player inputs and a game display for displaying game play.

In either of the game devices 120 previously discussed (e.g., slot-type or video-type), there is an interface board 116 installed therein. The interface board 116 connects the internal microprocessor of the game device 120 and the progressive controller 102. Additionally, the interface board 116 provides controls and processing means for sending and receiving communications over the game network 100.

Figure 2:
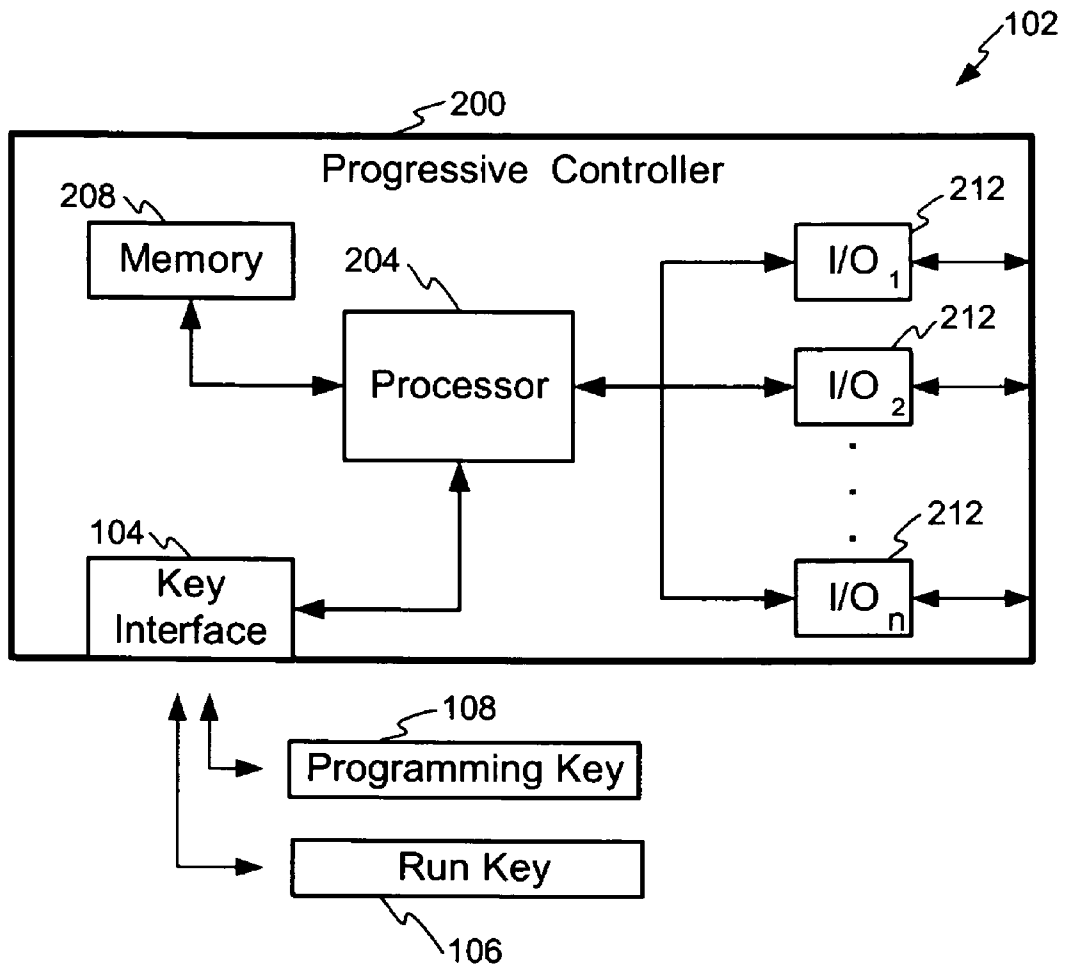
FIG. 2 is a block diagram of an example embodiment of a progressive controller.

FIG. 2 illustrates a block diagram of an example embodiment of the progressive controller 102. Internal to the progressive controller housing 200 is a processor 204 for running various executable codes that facilitate operation of the progressive game network 100. The executable code is stored within memory 208 and the executable code is accessed by the processor 204 through a bi-directional communication link between the processor 204 and memory 208. The memory 208 may be volatile, non-volatile or a combination of both. Examples of memory 208 include random access memory, optical disk drive technology, magnetic disk drive technology, read only memory, secured digital memory card or other types of computing memory now known or later developed.

In this example embodiment, there are several input/output ports 212 associated with and operatively connected to the processor 204. The I/O ports 212 facilitate communication between the progressive controller 102 and the game devices 120. In this example embodiment there is one I/O port 212 for each channel associated with the progressive game network 100.

The progressive controller 102 is further configured with a key interface 104. The key interface 104 is structured to operatively accept a single security key (i.e., either a programming key or a run key) and is further structured to facilitate bi-directional communication between the processor 204 and the inserted security key.

In one embodiment and to provide additional security, the key interface 104 is only accessible by unlocking a portion of the progressive controller housing 200. Once unlocked, a user may insert or replace a security key (i.e., replace a run key with a programming key or vise-a-versa).

A programming key 108 is configured with progressive system parameters and establishes the progressive controller 102 configuration and permits access to the various progressive award configuration menus associated with the progressive controller. The programming key 108 is used to access the configuration menus and may be assigned to a particular designated employee of the gaming establishment. In this way, the designated employee is paired with the particular programming key 108 and is responsible for the proper use of the programming key. A "gaming establishment" is defined as an operator of game devices and may comprise a casino, riverboat, cruise ship, lounge, or other business entity providing gaming activities.

In this example embodiment the programming key 108 has substantially identical internal configuration as a run key 106, discussed below, except for a data bit modification that identifies the programming key, as such, to the progressive controller 102. The data bit modification may be a flagged memory location, a "dip" switch setting, or a particular jumper arrangement internal to the programming key structure. It is contemplated that the programming key data bit modification provide adequate security from tampering and further provide distinguishing characteristics from the run key 106. Correspondingly, once the programming key 108 is inserted into the key interface 104, and because of the data bit modification, the progressive controller 102 will automatically recognize the key as a programming key 108.

In operation, the programming key 108 controls access to the progressive controller configuration settings and parameters. Upon insertion of the programming key 108 into the key interface 104, the progressive controller 102 presents a series of progressive controller configuration menus to the user which would not otherwise be visible or accessible. The key interface 104 is configured to accept only one security key at a time, and thus any security key previously inserted into the key interface 104 is required to be removed before another key can be inserted.

In one exemplary method of operation, once the programming key 108 inserted into the key interface 104, any game devices 120 connected to the progressive controller 102 will be automatically disabled and not available for game play while the programming key remains inserted into the key interface. In this way, when a programming key 108 is inserted in to the key interface 104, the progressive game network 100 is inoperative with respect to accepting wagers and providing game play events. In another embodiment, only the progressive aspect is disabled.

A run key 106 is configured with run key parameters that are used to enable operation of the progressive network and authenticate the number of game devices 120 connected to the progressive controller 102. In this embodiment the run key 106 controls the number of game devices 102 that can access the progressive controller. In this embodiment the run key is inserted into the key interface 104 for the progressive game network 100 to function.

The run key 106 has substantially identical internal configuration as a programming key 108, discussed above, except for a data bit modification that identifies the run key, as such, to the progressive controller 102. The data bit modification may be a flagged location of memory, a "dip" switch setting, or a particular jumper arrangement internal to the run key structure. It is contemplated that the run key 106 data bit modification provide adequate security from tampering and further provide distinguishing characteristics from the programming key 108. Correspondingly, once the run key 106 is operatively inserted into the key interface 104, and because of the data bit modification, the progressive controller 102 will automatically recognize the key as a run key 106.

In operation, the run key 106 authenticates the number of game devices connected to the progressive controller 102. Upon insertion of the run key 106 into the key interface 104, the progressive controller 102 activates and permits authenticated game devices 120 to participate in the progressive award.

The key parameters, which are stored within the security keys (i.e., run key 106 or programming key 208) comprise, but are not limited to: Gaming Establishment Customer Number, Maximum Number of Game Devices, Maximum Number of Progressives, Progressive Controller Serial Number, Key Serial Number, Key Expiration Parameters or other data considered pertinent to the operation of the progressive game network 100. Alone or in combination the progressive controller, the key provides security and authentication functionality for the progressive system.

Figure 3:
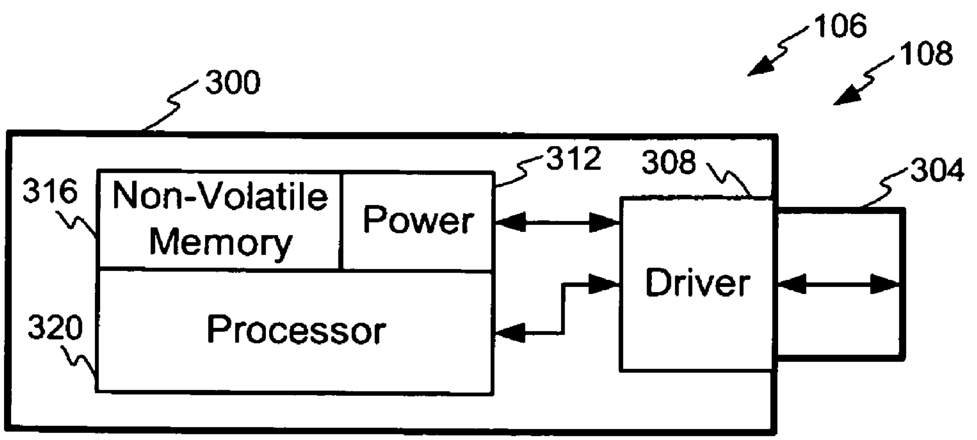
FIG. 3 is a block diagram of an example embodiment of a security key.

FIG. 3 illustrates a block diagram of an exemplary key used in the present invention. The exemplary key of FIG. 3 is either a run key 106 or programming key 108. The key comprises a key housing 300 which provides structural support and encapsulation of the key's electronic components. A bi-directional communication connector 304 interfaces with the key interface 104. The communication connector 304 can be a universal serial bus (USB), firewire, serial, parallel or other type of connector now known or later developed that provides releasable engagement for an electrical device.

Internal to the security key is a bi-directional communication driver 308 such as a RJ-45 driver or any other type driver. It is contemplated that the driver 308 facilitates bi-directional communication between the key and the progressive controller 102 through the key interface 104. The driver 308 additionally provides a power source conduit to the internal components of the key.

The security key further comprises a power conditioner 312 that supplies power to the internal non-volatile memory 316 and the microprocessor 320. The power conditioner 312 transforms, filters or stores electrical power for use by the memory 316, microprocessor 320 or both.

The non-volatile memory 316 is accessible by the processor 320 and stores data, as described above, and configured to receive executable code for processing functionality. Some examples of non-volatile memory 316 are: flash memory, secured digital memory or other types of memory now known or later developed that provides for reliable and non-volatile data storage.

The microprocessor 320 provides data processing functionality to the security key and is configured to access data and/or run executable code stored within memory 316. It is contemplated that the microprocessor 320 be selected such that the processor is capable of handling the frequent and constant polling by the progressive controller.

Figure 4:
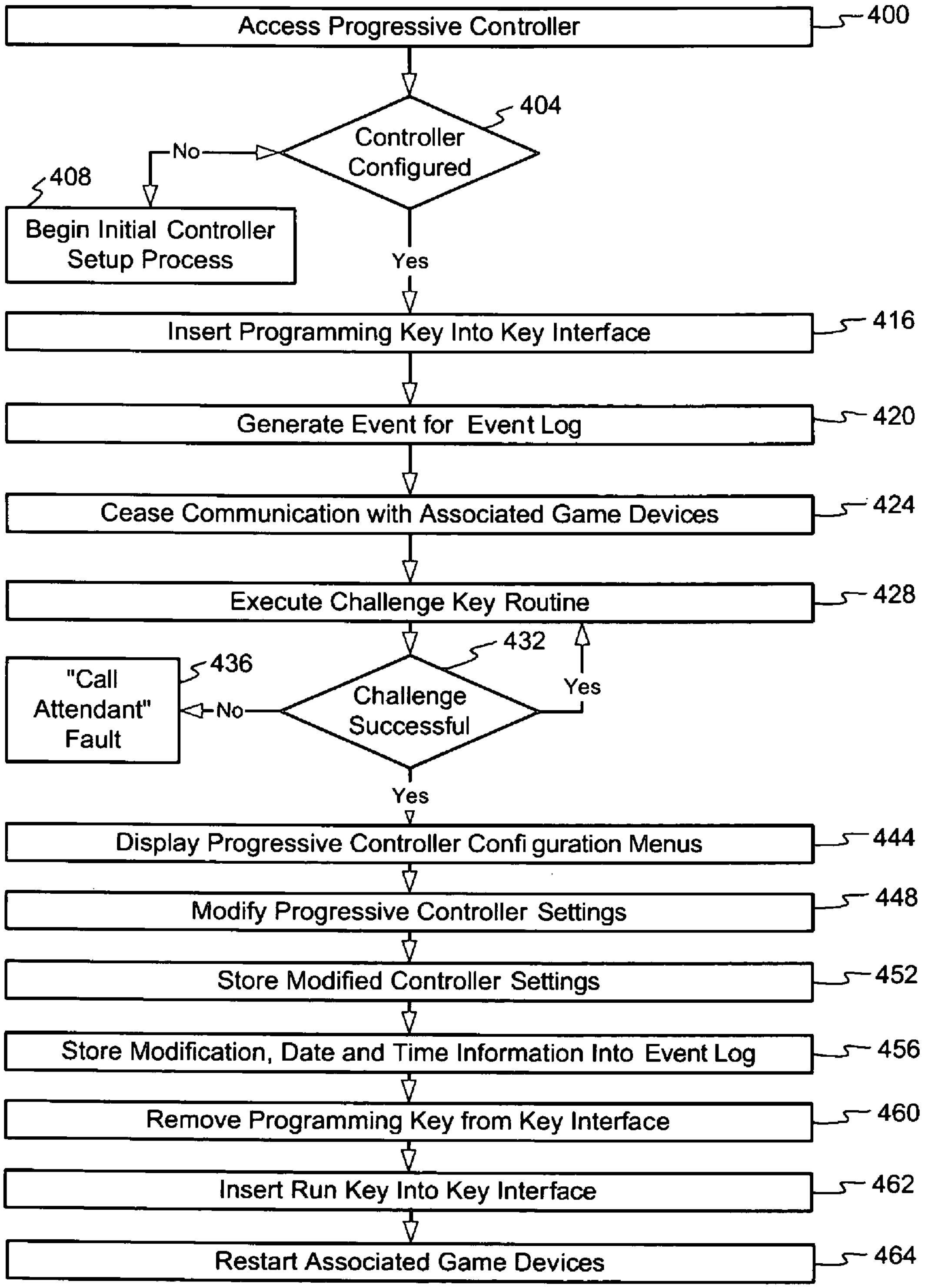
FIG. 4 is an operational flow diagram of one example embodiment for programming a progressive system

FIG. 4 is an operational flow diagram illustrating potential steps for programming a progressive system. This is but one possible method of operation and as such, it is contemplated that other methods of operation may occur based on this disclosure. At a step 400, a user or other entity gains access to the progressive controller. In the preferred embodiment, the user would physically access the controller by opening and possibly unlocking the progressive controller security cabinet or housing. The progressive controller may have a computer display associated therewith or the user may connect another computer device (i.e., a laptop computer) to facilitate communication with the progressive controller.

Once the user has accessed the progressive controller the user next determines if the progressive system is configured. This occurs at a step 404. There are two possible outcomes of step 404, the first being that the controller is not configured. If the controller is not configured, then the progressive controller will require an initial controller setup 408 which is termed herein as "birthing". The birthing process establishes the progressive controller's settings and provides a baseline operating configuration.

The second possible outcome of step 404 may be that the progressive controller is already configured. If the controller is configured, then the operation advances to a step 416. At step 416, the user inserts the programming key into the key interface of the progressive controller to thereby gain access to the controller's configuration menus. Absent the programming key, the user may not access the configuration menus.

The key interface preferably has provision for insertion of only one security key at a time. Correspondingly, during step 416 if there is a key already in the key interface it should be removed to provide an open receptacle for the programming key. For example, if the progressive game network was running there would be a run key installed into the receptacle of key interface. The run key would need to be removed before the programming key could be inserted and the progressive award system programmed or modified. After insertion of the programming key, the operation advances to a step 420 wherein an event is generated and stored in an event log. The event log is a continually running data acquisition system that records information pertaining to the status of the progressive controller and associated game network. Changes to the controller may be recorded in the event log. It is contemplated, that the generated event of step 420 records data regarding the event, such as but not limited to: date stamp, time stamp, listing of modifications and personnel identification associated with the programming key. The generated event data is subsequently stored within the progressive controller and preferably within a secure non-volatile memory device such as a secured digital memory card. Recording the events, such as changes to the progressive controller configuration provides the benefit of notifying the gaming establishment if there is a malfunction or if the game device reports a jackpot of an incorrect amount. As a result of recording events pertaining to the progressive controller configuration the gaming establishment can monitor and determine who and when any configuration parameters may have changed. The recorded event information provides an evidentiary trail with respect to who was responsible for the incorrect setup of the controller that caused the incorrect payout or other malfunction. Additionally, the recorded information provides gaming regulators a way to see if the gaming establishment has changed the parameters to cheat the customers or the tax collectors.

Next at a step 424, the progressive controller halts communication with the associated game devices. The communication over channels to game devices discontinues when the run key is either not present or removed from the key interface. In this way, the progressive controller enters into a programming mode when the run key is removed and the programming key is inserted into the key interface. At a step 428, the progressive controller executes a challenge key routine which verifies that the proper programming key has been inserted into the key interface. The challenge key routine is disclosed in greater detail below with reference to FIGS. 6A & 6B.

During the execution of the challenge routine 432 there are two possible outcomes. The first outcome is that the challenge routine was not successful. An unsuccessful challenge routine generates a fault error, such as a "Call Attendant" fault 436. When a "Call Attendant" fault 436 occurs, the progressive controller may become inoperative and require attention from casino management, security or both. Thus, a fault will bring attention to the situation where an inappropriate programming key has been used in an attempt to modify progressive award settings.

The second possible outcome is that the challenge routine was successful and in this situation there are two additional possible outcomes. First, in a successful key challenge, the positive outcome is redirected to execute the challenge key routine again. In this way, the challenge key routine cycles and continually verifies or authenticates the inserted programming key. In one embodiment, the challenge key routine may repeat every three to five seconds. However other time intervals may be utilized. Secondly, in a successful key challenge, the programming key is authenticated and the programming of the progressive controller proceeds to subsequent steps such as the display of configuration menus at a step 444.

At step 444, as a result of the successful challenge key routine the progressive controller displays one or more progressive award configuration menus. The configuration menus provide a convenient and intuitive interface for selecting, modifying and storing various progressive controller parameters. The available progressive parameters that can be configured depend upon the specific type of progressive award offered by the gaming establishment. For example, in a standard progressive some of the parameters that may be configured include: a base award amount, a reset amount and an increment rate. In a mystery progressive, the configurable parameters may include a base amount, minimum award amount, maximum award amount and an increment rate. These are just two examples of progressive awards and their configurable parameters. However one of ordinary skill in the art understands that there are other progressive award parameters specific to the play rules of the desired progressive system. Consequently, the progressive award parameters or settings can be modified at a step 448. Next, the modified progressive controller settings are securely stored within the progressive controller and preferably within controller memory.

Upon completion of the modification or configuration process, pertinent data is recorded in the event log at a step 456. The modification process data may include: a date stamp, time stamp, identification data, pre-modified parameters, post-modified parameters or other useful data regarding the modification process. The event log then subsequently stores the data with the progressive controller and preferably within controller memory.

Once the progressive controller has been adequately programmed or configured the programming key is removed from the key interface at a step 460. Subsequently, at a step 462, a run key is inserted into the key interface to place the progressive controller into a "run" mode. The progressive game network is then restarted at a step 464 and players may subsequently begin wagering at the game devices utilizing the new or modified progressive controller parameters/settings. As discussed below, in at least one embodiment the run key must be inserted into the controller interface for the progressive system to operate.

Figure 5:
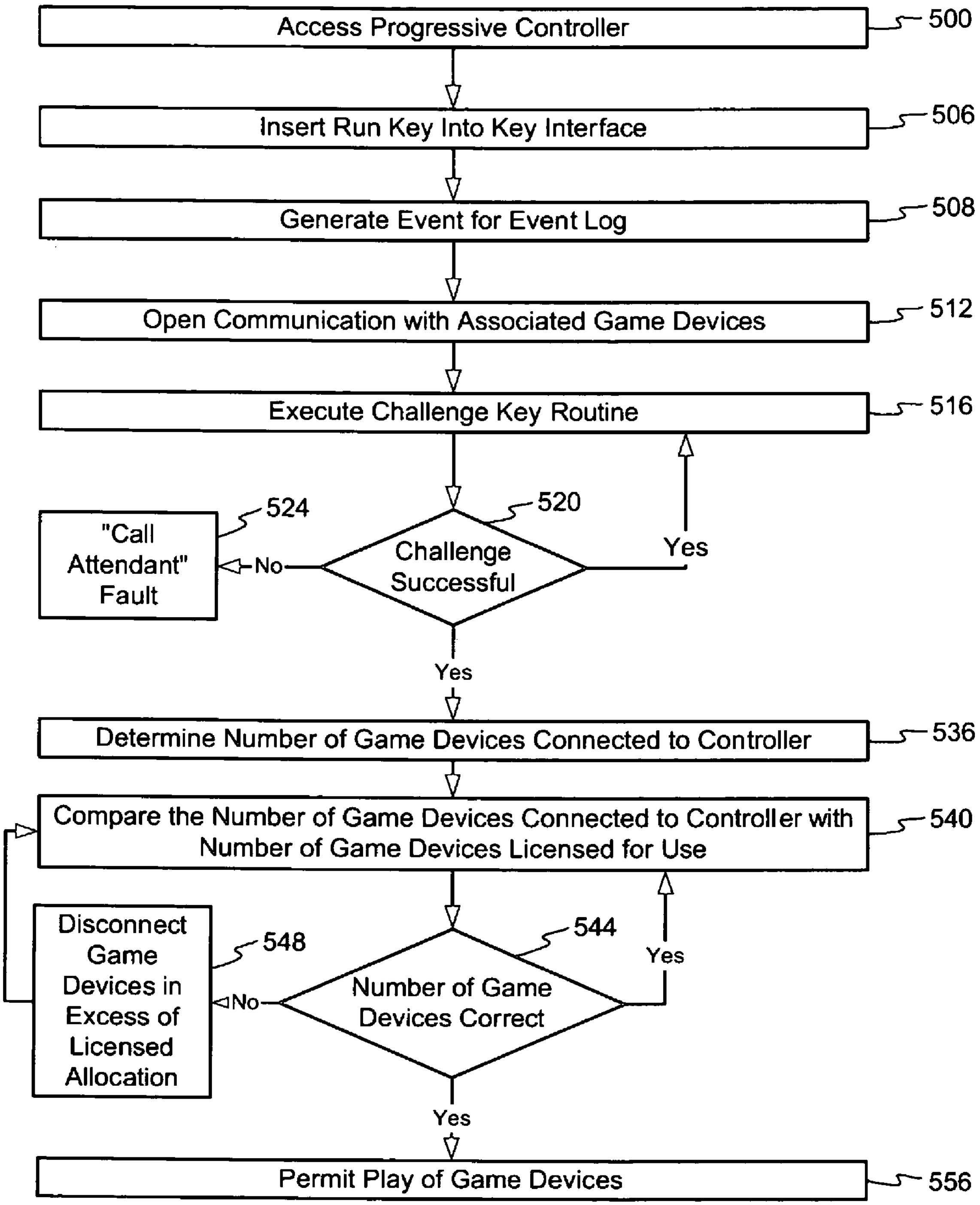
FIG. 5 is an operational flow diagram of one example embodiment for monitoring a progressive system.

Turning now to FIG. 5, which is an operational flow diagram illustrating potential steps for monitoring a progressive award system. At a step 500, the programming begins with accessing the progressive controller. In one embodiment, the user would physically access the controller by opening and possibly unlocking the progressive controller security cabinet or housing. The progressive controller may have computer display associated therewith or the user may connect another computer device to facilitate communication with the progressive controller.

The next step 506 is to insert the run key into the key interface of the progressive controller. The key interface preferably has provision for insertion of only one security key at a time. Correspondingly, during step 506 if there is a key already in the key interface it may be removed to provide an open receptacle for insertion of the run key. For example, if the progressive game network was previously being programmed there would be a programming key installed into the key interface. The programming key would need to be removed before the run key could be inserted and the progressive award system monitored. After insertion of the run key, an event is generated and stored in the event log at a step 508. The event log is a continually running data acquisition system that records information pertaining to the status of the progressive controller. It is contemplated, that the generated event of step 508 may provide data such as: date stamp, time stamp, listing of modifications and personnel identification associated with the run key. The generated event data is subsequently stored within the progressive controller and preferably within a secure non-volatile memory device such as a secured digital memory card.

At a step 512, the progressive controller opens communication with the associated game devices. The communication over the channels to game devices is initiated when the run key is engaged with the key interface. In this way, the progressive controller enters into a run mode when the programming key is removed and the run key is inserted into the key interface. At a step 516, the progressive controller executes a challenge key routine which verifies that the proper run key has been inserted into the key interface. The challenge key routine is disclosed in greater detail below with reference to FIGS. 6A & 6B.

During the execution of the challenge routine 520 there are two possible outcomes. The first possible outcome is that the challenge routine was unsuccessful. An unsuccessful challenge routine results in a fault error, such as a "Call Attendant" fault 524. When a "Call Attendant" fault 524 occurs, the progressive controller may become inoperative and require attention from casino management, security or both. Thus, a fault error will bring attention to the situation where an inappropriate run key has been used to actively monitor or run the progressive game network.

The second possible outcome from step 520 is that the challenge routine was successful. First, in a successful key challenge, the operation returns to step 516 to execute the challenge key routine again. In this way the challenge key routine continually cycles and verifies or authenticates the inserted run key. In one embodiment, the challenge key routine repeats every three to five seconds. However other time intervals may be configured.

Secondly, in a successful key challenge, the run key is authenticated and the operation will proceed to subsequent steps such as determining the number game devices connected to the game network. At a step 536, the progressive controller polls or queries each of the game devices associated with the progressive system. The polling process provides the progressive controller with the number of game devices connected or logged onto the progressive system. At a step 540, the operation compares the number of connected game devices acquired at a step 536 to the actual number of game devices permitted for use by the gaming establishment. In one embodiment, the number of permitted game devices is stored in electronic data form within the run key. In this way, the run key provides the comparison value for the correct number of game devices that are permitted on the progressive game network.

After the comparison of step 540, there are two possible outcomes from a step 544. The first possible outcome is that the comparison was unsuccessful (i.e. the number of connected game devices exceeds the number of licensed game devices) and in this situation the excess game devices are excluded from the progressive game network. In one embodiment an excluded game device may display a fault error such as a "Call Attendant" fault. When a "Call Attendant" fault occurs, the game device may become inoperative and require attention from casino management, security or both. Additionally, after excluding excessive game devices, the process of step 544 is repeated in a continual cycle. It is contemplated that the comparison routine is repeated every three to five seconds. However, other time intervals may be implemented.

Game devices are excluded from the game network when the progressive controller ceases polling the particular game device. For example, the game device internal executable code is configured such that the code is expecting a polling inquiry from the progressive controller at predefined intervals of time. When the game device does not receive a polling request as expected, the game device enters into a fault mode and is no longer available to accept wagers or permit player interaction.

The second possible outcome from step 544, is that the comparison was successful, which in turn leads to the operation of two additional steps. Firstly, if the challenge was successful the operation returns to step 540 to execute the comparison routine again. In this way, the comparison routine continually cycles and verifies or authenticates that the number of connected game devices does not exceed the licensed number of permitted game devices. In one embodiment, the comparison routine repeats every three to five seconds. However, other time intervals may be adopted. Secondly, in a successful challenge routine, the number of connected game devices is authenticated and operation of the progressive system occurs at a step 556.

Figure 6A:
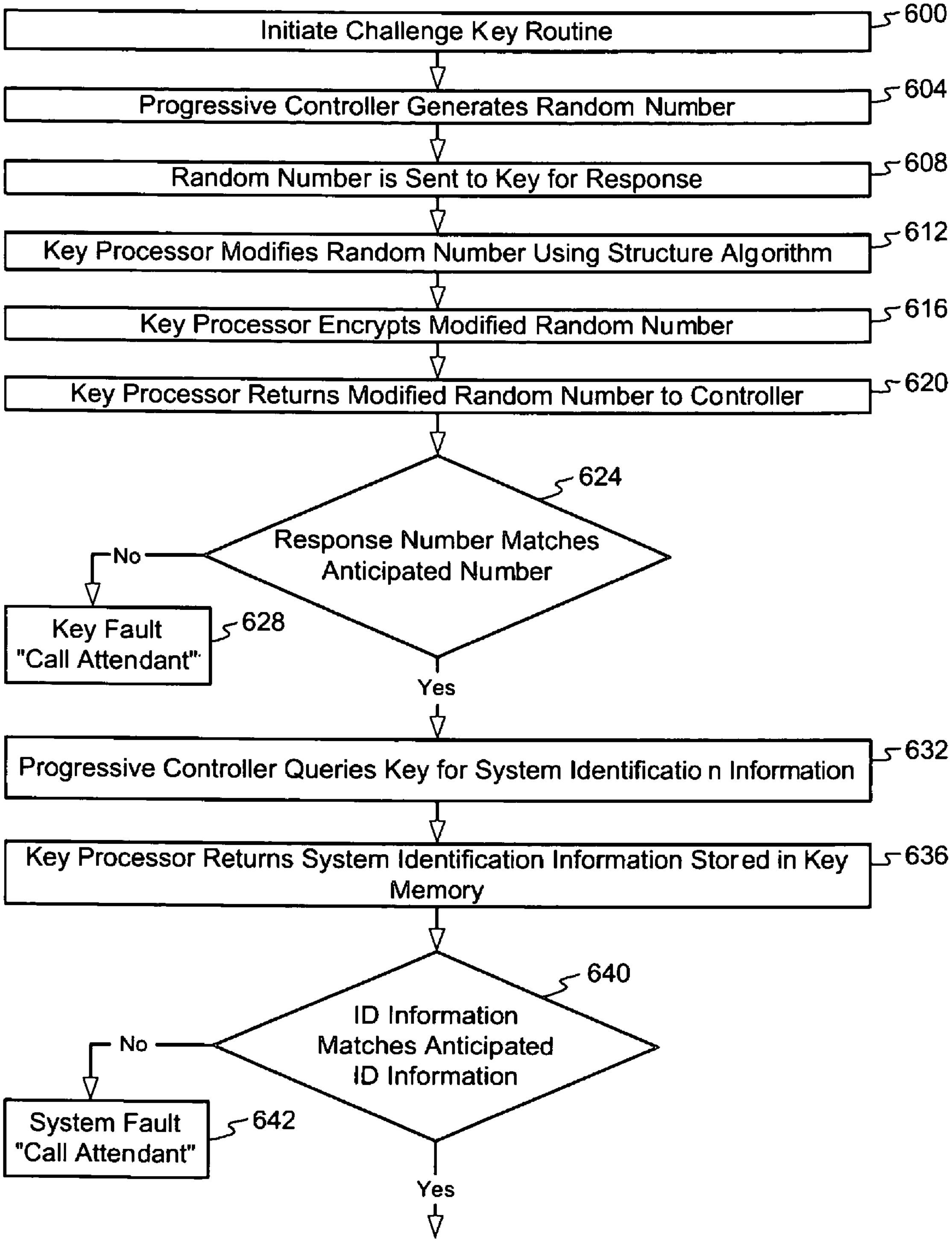
FIGS. 6A & 6B is an operational flow diagram of one example embodiment for verification of the security key.

As introduced above, and referring to FIG. 6A, upon insertion of either the run key or programming key, the progressive controller initiates a challenge key routine at a step 600. The challenge key routine authenticates the security keys and assures that the proper matched set of keys are inserted or used with the matching progressive controller. The challenge key routine proceeds, after initialization, by having the progressive controller generate a random number. This occurs at a step 604. At a step 608, the random number is sent to the particular security key (e.g., run key or programming key) for response.

In one embodiment, when the security key receives a randomly generated number from the progressive controller the key processor executes code stored within key non-volatile memory. It is contemplated that at a step 612, the executable code performs a modification of the random number by way of a predefined and structured algorithm. For example, the random number is modified by multiplying the number by a predetermined number. Subsequent to the modification process of step 612, the key processor encrypts the modified random number at a step 616. The number encryption may be performed by various types of encryption. One of ordinary skill in the art may implement other forms of encryption now known or later developed. It is further contemplated that the key processor returns the modified and encrypted random number at a step 620 to the progressive controller. Alternatively, this process may be reversed in that the key may generate the random number and forward it to the controller for modification.

At a step 624, a comparison is performed between the modified random number returned by the security key and an anticipated number within the progressive controller. The anticipated number is generated by the progressive controller using executable code stored within progressive memory that performs a modification of the random number by way of a predefined and structured algorithm. In this way, the progressive controller generates a random number that is sent to the security key and the progressive controller also generates a modified random number for use in the comparison.

In this example embodiment, there are two possible comparison outcomes which may occur at decision step 624. If the modified random number returned from the security key does not mach the anticipated number generated by the progressive controller, then a key fault would be generated at a step 628. A key fault may generate a "Call Attendant" alarm which may be displayed upon the progressive controller, the associated game devices or both. When a "Call Attendant" alarm occurs, the progressive game network may become inoperative and require attention from casino management and/or casino security.

Alternatively, if at decision step 624 the modified random number returned from the security key does match the anticipated number generated by the progressive controller then the challenge routine proceeds to a step 632 where the progressive controller subsequently queries for system identification information stored with in the non-volatile memory of the security key.

In one embodiment it is contemplated that system identification information includes specific progressive game network parameters such as: Gaming Establishment Customer Number, Maximum Number of Game Devices, Maximum Number of Progressives, Progressive Controller Serial Number, Key Serial Number, Key Expiration Parameters or other data considered pertinent to the operation of the progressive game network.

At a step 636, the security key returns system identification information stored within the key's non-volatile memory. In one embodiment the system identification information is encrypted by the key processor prior to transmission to the progressive controller. Next, at a step 640, a comparison is performed between the system identification information returned by the security key and anticipated system identification information stored within the progressive controller.

In one embodiment, there are two possible comparison outcomes for the system identification information. If the system identification information returned by the security key does not match the anticipated system identification information within the progressive controller then a system fault would be generated at a step 642. A system fault may generate a "Call Attendant" alarm which may be displayed upon the progressive controller, the associated game devices or both. When a "Call Attendant" alarm occurs, the progressive system may become inoperative and require attention from casino management and/or casino security.

Figure 6B:
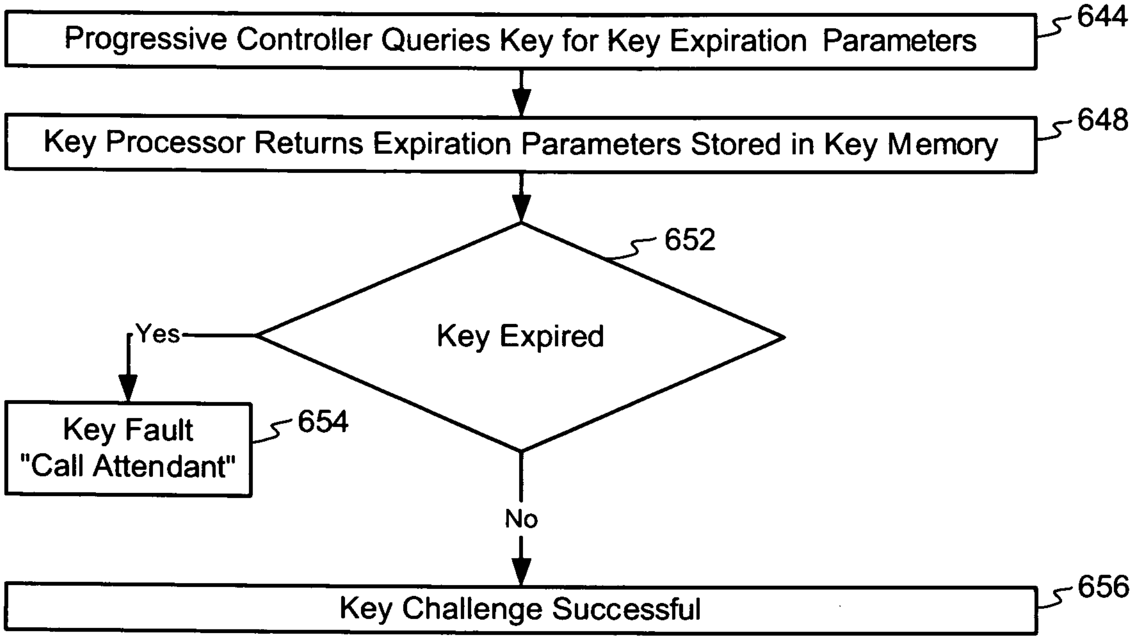

Alternatively, if the system identification information returned by the security key does match the anticipated system identification information then the progressive controller continues the challenge routine, as shown in FIG. 6B, by proceeding to query the security key for key expiration parameters at a step 644. A key expiration parameter may be a specific date, number of days-in-use, number of wagers played, an access counter or other parameters upon which the functionality of the security key is scheduled to discontinue. In one configuration the expiration parameter is referred to as a gas tank. In one embodiment, the access counter may be included with the initial configuration of the security key. Then as the progressive controller polls or queries the security key, the access counter is incremented each time a polling or query is performed. In this way, the security key has a finite pre-determined lifespan and when the access counter reaches a predefined value, the security key becomes inoperable. It is contemplated that the access counter is incremented by either adding or subtracting polling/query events from the initial value of the access counter.

Next, the key processor returns the expiration parameter to the progressive controller. In one embodiment, the key processor encrypts the expiration parameter prior to returning the expiration parameter to the progressive controller. The parameter encryption may be performed by various types of encryption, however one of ordinary skill in the art may implement other forms of encryption now known or later developed.

At a decision step 652, the operation examines whether the key is expired. Based on the outcome of step 652, the operation advances. At a step 654 the system generates a key fault and displays a "Call Attendant" alarm. In this case, the challenge key routine would be considered unsuccessful. The key may expire due to the expiration parameter exceeding a pre-determined threshold such as a fixed date, number of key access events (i.e., polling or queries), or other parameters that provide a means for controlling the operable lifespan of the security key. Alternatively, if at step 652 the operation determines that the key has not expired then the operation advances to a step 656 and the key challenge routine is considered successful.

In another embodiment, the progressive controller polls the security key. The progressive controller generates a random number that is the same size as the required data structure. This random number is scrambled by a pre-determined algorithm, which is the same algorithm also used by the security key. As defined herein, the term "scrambled" refers to various types of data manipulation such as encrypting and/or code hashing by which these techniques are well know to one of ordinary skill in the art. The scrambled random number is then sent to the security key. The security key receives the scrambled random number from the progressive controller. Next, the security key unscrambles the random number to obtain the original random number generated by the progressive controller. The security key uses this original random number to scramble the data programmed in the security key. The security key scrambles the data in a pre-determined fashion using the original random number and the scrambled data is sent back to the progressive controller. Upon receipt of the scrambled data, the progressive controller unscrambles the data using the original random number to unscramble the data using the same pre-defined algorithm used in the security key. Additionally, included within the scrambled data is a cyclic redundancy check (CRC) calculation that is used to determine the validity of the data. This CRC is calculated on the received data after the descrambling of data and is compared to the transmitted CRC. If both of these CRC values are identical then the security key data is determined valid.

As one of ordinary skill in the art will appreciate, a cyclic redundancy check (CRC) is a type of hash function used to produce a checksum—a small, fixed number of bits—against a block of data, such as a packet of network traffic or a block of a electronic data. The CRC checksum is used to detect errors after transmission and/or storage of data. A CRC is typically computed and appended before transmission or storage, and usually verified afterwards by the recipient of the data to confirm that no changes to the data occurred during transit.

Figure 7:
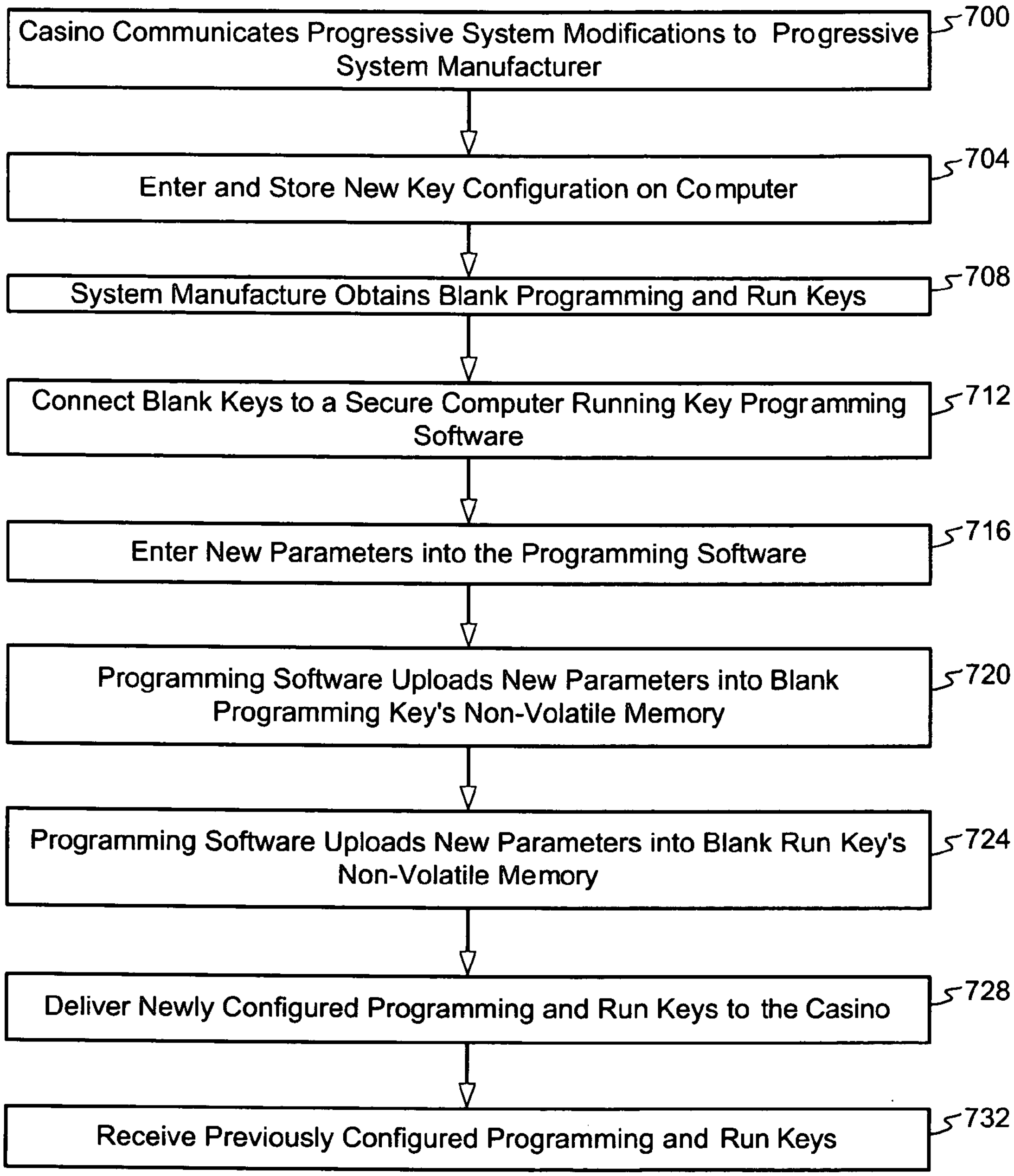
FIG. 7 is an operational flow diagram of one example embodiment for programming a pair of security keys.

Reference is now made to FIG. 7, which is an operational flow diagram that illustrates potential steps for programming a pair of security keys. It is contemplated, that a gaming establishment may want to implement various changes or modifications to an existing progressive system. Any type modification is possible, such as decreasing or increasing the number of game devices connected to the game network, altering the number progressive awards offered, or altering the type of progressive awards offered. Correspondingly, when the gaming establishment implements such modifications there are likely be changes to the fee owed by the gaming establishment to the progressive system manufacturer. The modifications may require reconfiguration or reprogramming of the security keys to ensure that the progressive game network functions properly within the terms and conditions of an agreement. For example the key and controller parameter which limits the number of machines that connect to the controller must match the new configuration.

At a step 700, the gaming establishment or casino communicates progressive system modifications to the progressive system manufacturer. The communication occurs in any manner including telephone, written letter, email, facsimile or other communication techniques now known or later developed. Once the modifications are communicated to the system manufacturer, the modifications and new security key configurations are entered and stored on a computer, this occurs at a step 704. The computer preferably has a comprehensive database for storing electronic configuration data.

At a step 708, the progressive system manufacture obtains a set of blank or unprogrammed security keys (i.e. a run key and a programming key). The security keys are connected to a secure computer running key programming software (executable code) at a step 712. The software has an interface for receiving input from a user, in which the input includes the progressive system modifications or new system parameters. The new parameters are entered into the programming software at a step 716.

Next, at a step 720, the new progressive system parameters are uploaded by the programming software into the blank programming key's non-volatile memory. Likewise, at a step 724 the programming software uploads the new parameters into the run key's non-volatile memory.

Upon successful uploading of the new progressive system parameters into both the run key and programming key, the newly configured security keys are delivered to the gaming establishment or casino at a step 728. Next, at a step 732, the progressive system manufacture receives the previously programmed security keys from the gaming establishment. It is contemplated, that the previously programmed security keys must be returned to the system manufacturer to prevent having multiple sets of operable security keys from being in the gaming establishment's possession, unless there is an enforceable agreement in effect for each set of operable security keys.

In one embodiment, the newly configured/programmed security keys are delivered to the gaming establishment prior to return of the previously programmed security keys. In this way, the progressive system will continue to operate during the change in keys. This avoids the situation in which the gaming establishment is required to first return the previous programmed security keys (i.e., causing the progressive system to be inoperative) and wait to receive a newly programmed set of security keys. Conversely, in another embodiment, the gaming establishment returns the previously programmed keys prior to receipt of the newly programmed keys.

As will now be apparent, progressive systems configured according to the teachings of the invention provide a number of advantages over known systems which do not have secure configuration and authentication as described herein.

Numerous benefits are realized by the method and apparatus described herein. Incorporating the use of multiple security keys increases the security and accountability of the progressive system and decreases the potential for inaccurate or fraudulent controller configuration. The traditional way in which progressive systems were configured did not adequately prevent fraud or tampering. In the past, a progressive system may be compromised if for example unauthorized access to the progressive controller occurs, then the progressive controller configuration may be changed to inaccurate settings. By enabling access to the progressive system configuration settings only with actual possession of a tangible security key, the progressive system is more secure and there is a record of accountability because the tangible security key is assigned to a particular individual. Consequently, a gaming establishment enjoys increased security and accountability for their progressive system.

Secondly, by providing a dedicated security key such as the run key, a progressive system manufacture can adequately monitor and control the number of game devices connected to the progressive system. Existing progressive systems permit gaming establishments to connect excessive additional game devices to the progressive controller. In one or more configurations described herein, the controller continually monitors the number of game devices connected to the controller and compares this number to a predetermined maximum number of game devices. In the event the number of connected game devices exceeds the predetermined number, the excess game devices are automatically disabled. In this way, the progressive system manufacturer has increased control over the number of game devices that are connected to the game network.

Thirdly, the present invention provides the progressive system manufacturer with an enhanced ability to enforce and control the use of the progressive system. Through the use of various expiration parameters, the progressive system manufacturer has control over the duration of time that the progressive system is operable. Thus, the expiration parameters can be configured to coincide with the expiration of a license agreement. In this way, a gaming establishment is required to interact with the progressive system manufacture upon expiration of the license. This provides for increased accountability and maintains compliance with the terms of the agreements.

While various embodiments of the invention have been described, it will be apparent to those of ordinary skill in the art that many more embodiments and implementations are possible that are within the scope of this invention. In addition, the various features, elements, and embodiments described herein may be claimed or combined alone in any combination or arrangement.

What is claimed is:

1. A system for configuring and authenticating a progressive game network, the system comprising:
- a plurality of gaming devices providing game play on the progressive game network;
- a first security key configured with progressive game network programming parameters;
- a second security key configured with progressive game network operation parameters;
- a progressive controller comprising:
  - a key interface integrated with the progressive controller, wherein the key interface is configured to receive only one of the first security key and the second security key;
  - memory having machine readable code stored thereon, the machine readable code configured to:
    - authenticate the first security key or the second security key when the first security key or the second security key is in the key interface; and
    - in response to a successful authentication of the first security key, disable said game play on the progressive game network and permit programming of the progressive controller with the progressive game network programming parameters associated with the first security key; and
    - in response to a successful authentication of the second security key, permit operation of the progressive game network based on the progressive game network operation parameters associated with the second security key.

2. The system of claim 1, wherein the first security key and the second security key comprise a processor and a memory.

3. The system of claim 1, wherein the first security key comprises a programming key and the second security key comprises a run key.

4. The system of claim 3, wherein the run key further comprises an expiration parameter which, when expired, prevents operation of the run key, the progressive controller, or both.

5. The system of claim 1, wherein the machine readable code is further configured to, as part of the authentication, perform a calculation on a value sent to the first security key or the second security key and compare a value resulting from the calculation to a value received from the first security key or the second security key.

6. The system of claim 1, further comprising a gaming machine interface configured to disable one or more aspects of the plurality of gaming devices if the authentication is unsuccessful.

7. The system of claim 1, wherein the authentication comprises comparing data stored within the first or second security key with data stored within the progressive controller.

8. A system for configuring and authenticating a progressive game network, the system comprising:

at least one security key configured with one of progressive game network programming parameters and progressive game network operation parameters, wherein the at least one security key is configured to interface with a progressive controller;

a progressive controller that manages a progressive award for a plurality of gaming devices, the progressive controller comprising:

at least one key interface configured to receive the at least one security key;

at least one input/output port configured to interface with one or more gaming device interfaces associated with the plurality of gaming devices, each of the plurality of gaming devices receiving wagers from players, a portion of the wagers added to the progressive award;

an authenticator configured to interface with the at least one key interface to authenticate the at least one security key, disable operation of the gaming device interfaces and permit programming of the progressive controller with the progressive game network programming parameters or enable operation of the progressive controller and the gaming device interfaces with the progressive game network operation parameters in response to a successful authentication, or disable operation of at least one of the progressive controller and the gaming device interfaces in response to an unsuccessful authentication.

9. The system of claim 8, wherein the authenticator comprises hardware.

10. The system of claim 8, wherein the authenticator comprises software.

11. The system of claim 8, wherein the authenticator comprises a combination of hardware and software.

12. The system of claim 8, wherein the at least one security key comprises a program key and a run key.

13. The system of claim 12, wherein the progressive controller is configured to operate a predetermined number of game devices only if the run key is interfacing with the at least one key interface and if the run key is successfully authenticated by the authenticator.

14. A method of configuring a progressive system, the method comprising:

coupling a progressive controller to a plurality of gaming devices, wherein the progressive controller includes a key interface, a memory, and a processor coupled to the key interface and to the memory, wherein the progressive controller is configured to manage a progressive award for the plurality of gaming devices;

receiving a security key into the key interface, wherein the security key is configured with one of progressive game network programming parameters and progressive game network operation parameters, wherein the security key is configured to enable configuration of the progressive controller;

interrogating the security key using the processor;

in response to a successful interrogation, disabling operation of the plurality of gaming devices and permitting modification of at least one progressive controller parameter via the progressive game network programming parameters or enabling operation of the plurality of gaming devices according to the progressive game network operation parameters;

displaying the at least one progressive parameter modification;

storing the modified at least one progressive controller parameter in the memory;

removing the security key from the key interface; and un-displaying the at least one progressive controller parameter modification.

15. The method of claim 14, wherein interrogating the security key comprises analyzing data received from the security key.

16. The method of claim 14, wherein interrogating the security key comprises:

generating a first value within the progressive controller;

sending the first value from the progressive controller to the security key;

processing the first value within the security key to generate second value;

processing the first value within the progressive controller to generate a third value; and comparing the second value to the third value.

17. The method of claim 14, wherein displaying at least one progressive controller parameter modification comprises displaying one or more menu options for software configuration.

18. The method of claim 14, wherein interrogating the security key comprises repeating one or more times during the displaying and modifying.

19. A method of enabling operation of a progressive system, the method comprising:

coupling a progressive controller to a plurality of gaming devices, wherein the progressive controller includes a key interface, a memory, and a processor coupled to the key interface and to the memory, wherein the progressive controller is configured to manage a progressive award for the plurality of gaming devices;

receiving a security key into the key interface and disabling operation of the progressive system with respect to a predetermined number of the plurality of gaming devices connected thereto, wherein the security key is configured with one of progressive game network programming parameters and progressive game network operation parameters, and wherein the security key is configured to enable operation of the progressive controller;

interrogating the security key;

permitting programming of the progressive controller with one of the progressive game network programming parameters and the progressive game network operation parameters in response to a successful interrogation;

operating the progressive system;

intermittently monitoring for the presence of and interrogating the security key while the progressive system is operating;

in response to interrogating the security key while the progressive system is operating, enabling operation of the progressive system when the security key includes the progressive game network operation parameters; and in response to interrogating the security key, disabling operation of the progressive system when the security key includes the progressive game network programming parameters.

20. The method of claim 19, wherein interrogating the security key comprises analyzing data received from the security key.

21. The method of claim 19, wherein interrogating the security key comprises:

generating a first value within the progressive controller;

sending the first value for the progressive controller to the security key;

processing the first value within the security key to generate second value;

processing the first value within the progressive controller to generate a third value; and comparing the second value to the third value.

22. The method of claim 21, wherein processing the first value within the security key comprises generating an encrypted second value.

23. The method of claim 19, wherein interrogating the security key comprises repeating the interrogation one or more times during the operation of the progressive system.

* * * * *